(12) United States Patent
Hammarlund et al.

(10) Patent No.: US 7,130,965 B2
(45) Date of Patent: Oct. 31, 2006

(54) APPARATUS AND METHOD FOR STORE ADDRESS FOR STORE ADDRESS PREFETCH AND LINE LOCKING

(75) Inventors: Per H. Hammarlund, Hillsboro, OR (US); Stephan Jourdan, Portland, OR (US); Sebastien Hily, Hillsboro, OR (US); Aravindh Baktha, Portland, OR (US); Hermann Gartler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 10/743,134

(22) Filed: Dec. 23, 2003

(65) Prior Publication Data

US 2005/0138295 A1 Jun. 23, 2005

(51) Int. Cl.
*G06F 12/00* (2006.01)
(52) U.S. Cl. ............... 711/122; 711/135; 711/144
(58) Field of Classification Search ........... 711/122, 711/135, 137, 141, 143–144, 146
See application file for complete search history.

(56) References Cited

U.S. PATENT DOCUMENTS

| | | | |
|---|---|---|---|
| 5,155,824 A * | 10/1992 | Edenfield et al. ............ 711/143 |
| 5,584,009 A * | 12/1996 | Garibay et al. .............. 711/117 |
| 5,630,075 A | 5/1997 | Joshi et al. | |
| 5,764,946 A * | 6/1998 | Tran et al. .................... 712/239 |
| 5,860,112 A * | 1/1999 | Langendorf et al. ......... 711/143 |
| 6,073,210 A | 6/2000 | Palanca et al. | |
| 6,122,715 A | 9/2000 | Palanca et al. | |
| 6,321,297 B1 * | 11/2001 | Shamanna et al. ........... 711/122 |
| 6,366,984 B1 | 4/2002 | Carmean et al. | |
| 6,564,301 B1 * | 5/2003 | Middleton .................... 711/144 |
| 6,928,518 B1 * | 8/2005 | Talagala ....................... 711/135 |
| 2003/0225980 A1 * | 12/2003 | Henry et al. ................. 711/144 |
| 2004/0117573 A1 * | 6/2004 | Sutanto et al. ............... 711/163 |

* cited by examiner

*Primary Examiner*—Nasser Moazzami
(74) *Attorney, Agent, or Firm*—Kenyon & Kenyon LLP

(57) ABSTRACT

Embodiments of the present invention relate to a memory management scheme and apparatus that enables efficient cache memory management. The method includes writing an entry to a store buffer at execute time; determining if the entry's address is in a first-level cache associated with the store buffer before retirement; and setting a status bit associated with the entry in said store buffer, if the address is in the cache in either exclusive or modified state. The method further includes immediately writing the entry to the first-level cache at or after retirement when the status bit is set; and de-allocating the entry from said store buffer at retirement. The method further may comprise resetting the status bit if the cacheline is allocated over or is evicted from the cache before the store buffer entry attempts to write to the cache.

37 Claims, 4 Drawing Sheets

APPARATUS AND METHOD FOR STORE ADDRESS FOR STORE ADDRESS PREFETCH AND LINE LOCKING

FIELD OF THE INVENTION

Embodiments of the present invention relate to high-performance processors, and more specifically, to a memory management scheme and apparatus that enables efficient cache memory management.

BACKGROUND

Current processors and/or microprocessors continue to increase their speed of operation as well as provide numerous advanced features. Some of these features include higher bandwidth for instruction fetches, pipelining, streaming single instruction multiple data instructions, dynamic out-of-order execution, faster internal system bus speeds, execution trace cache, advanced transfer cache, and write-back caching. A write-back cache is a cache in which modifications made during execution to data in the cache are not written out to main memory until absolutely necessary. Write-back caching has been available on many microprocessors since the late 1980s, for example, processors starting with the 80486 microprocessor, manufactured by Intel Corporation of Santa Clara, Calif. In contrast, a write-through cache operates in parallel to write data to the cache and to main memory at the same time. The performance of a write-through cache is not as good as a write-back cache, since a write-back cache has fewer write operations to main memory.

Current write-back caches include a store buffer in which store instruction addresses and data are temporarily written as they become available from the execution core and before they are written out to main memory. As the execution core retires instructions, that is, completes execution, and commits the results to the architectural state, an entry in the store buffer becomes committed and needs to be stored in main memory. The store buffer issues a store to update memory, if the data for the entry is still in the cache, the entry is written in the write-back cache. However, if the entry is not still in the cache or is invalid, due to being cleared out of the cache to make room for another entry or being snooped, the original entry must be read-in to the cache from a higher level memory, for example, a higher level cache or even main memory, before the new entry in store buffer may update memory. Waiting until the entry is about to be written out to the main memory to discover that it is no longer in the cache can adversely impact processor performance, since the store buffer cannot be reclaimed and reused while it is waiting to update memory. Lack of available store buffer entries is a common reason for programs to run slower. One solution is to provide a large enough store buffer that allows all stores to be allocated even for a large execution window. Unfortunately, store buffers this large are not the ideal solution, since they require large area, a lot of power, and are slow to access.

As a result, the problems associated with larger store buffers may be quite significant in typical programs written for out-of-order processor architectures. Therefore, it is useful to minimize the difficulties associated with large store buffers in out-of-order processors, especially speeding up the time it takes to update memory and allow the store buffer entry to be reclaimed.

DETAILED DESCRIPTION

Figure 1:
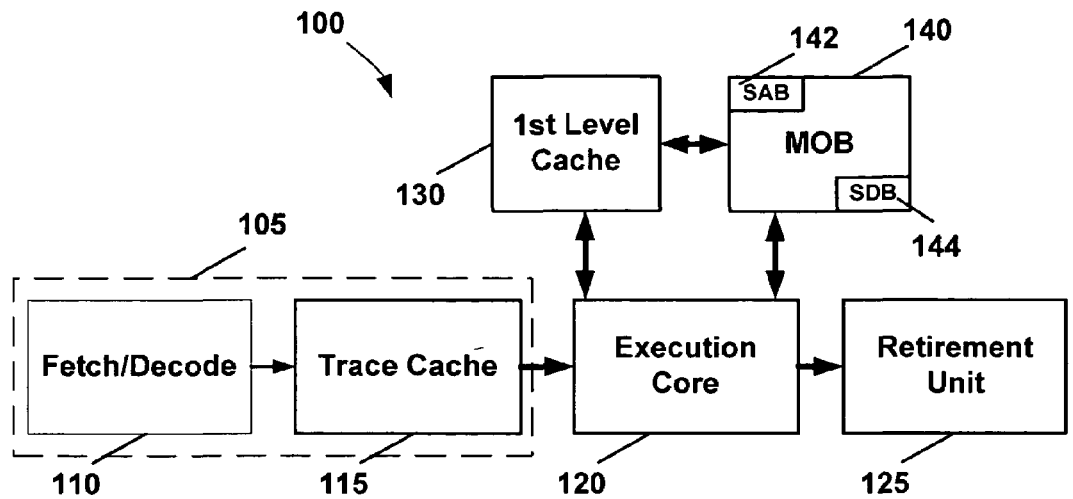
FIG. 1 is a functional block diagram of an out-of-order processor in which embodiments of the present invention may be implemented.

In accordance with embodiments of the present invention, a read for ownership (RFO), which is normally an ordered transaction that is sent post retirement, may be issued to a memory subsystem coupled to a processor out of the normal order. To accomplish this, the status of in-flight RFOs may be tracked in a store buffer, for example, a store address buffer ("SAB"), which may contain each architectural store that may be active in the processor. In accordance with an embodiment of the present invention, when a new entry is written to the store buffer a first-level cache coupled to the store buffer may be immediately queried to determine whether the entry is still in the first-level cache and is in either an exclusive or modified-exclusive state. A status bit, for example, a RFO done bit, associated with the entry in the store buffer may be set, if the entry is still in the first-level cache and is in either an exclusive or modified-exclusive state. If the entry is not still in the first-level cache and/or is not in either an exclusive or modified-exclusive state, the processor may request the entry be read-in from higher memory, for example, a higher-level cache, and the RFO done bit associated with the entry may be set in the store buffer after the entry is read back in to the first-level cache. In accordance with embodiments of the present invention, setting of the RFO done bit may occur as soon as the address is available in the store buffer, even if the data associated with the address is not yet available.

In accordance with the embodiments of the present invention, every fill and eviction of entries from the first-level cache may be tracked to ensure that the RFO done bits in the store buffer correctly reflect the state of the first-level cache. This is to ensure that any entry stored in the store buffer with its RFO done bit set is guaranteed to have a corresponding entry in the first-level cache that is in either the exclusive or the modified-exclusive state. Therefore, when an entry from the store buffer is to be stored out to memory, the RFO done bit may be checked to determine whether it is set, and, if it is set, the entry may immediately be committed to the architectural state and stored out to memory. Similarly, when a new entry is written to the first-level cache in either the exclusive or modified-exclusive state, the processor may CAM across the store buffer and set the RFO done bit in every other entry in the store buffer with the same address as the new entry. As a result, any stores that may be waiting for the cacheline containing this entry may immediately be stored out to memory when they become the oldest store and are ready to be stored out to memory. Likewise, if a cacheline containing an entry is either snooped by another process or evicted from the first-level cache, the processor may check all memory ("CAM") across the store buffer and any entries with a matching address may have their RFO done bit reset to indicate that the corresponding entry is no longer in the first-level cache. If an entry has its RFO done bit reset, and the address of the entry is known, the store buffer may reissue an RFO to fill the entry back in to the first-level cache and to reset the entry's RFO done bit in the store buffer. Additionally, if an entry in the store buffer does not have its RFO done bit set and there is no pending request for the cacheline, an RFO prefetch may be generated and sent.

FIG. 1 is a functional block diagram of an out-of-order processor in which embodiments of the present invention may be implemented. In FIG. 1, an out-of-order processor 100 may include a front-end component 105, which may include a fetch/decode unit 110 to fetch and decode instructions. Fetch/decode unit 110 may be coupled to a trace cache 115 to store the decoded instructions to be executed. Fetch/decode unit 110 also may be coupled to an instruction memory (not shown) such as, for example, a cache and/or higher level memory to obtain the instructions to be decoded. In embodiments of the present invention, each decoded instruction may be a single operation instruction that may include only a single decoded operation as well as a multiple operation instruction that may include one or more decoded operations, for example, micro-operations. Trace cache 115 may be coupled to an execution core 120 and trace cache 115 may store instruction operation traces of the decoded instructions for execution core 120 to execute. Execution core 120 may execute the traces from trace cache 115 either in order or out of order. Execution core 120 may be coupled to a retirement unit 125, which may retire the instruction traces after execution has been completed by execution core 120.

In FIG. 1, execution core 120 also may be coupled to a first-level cache 130, for example a write-back cache, to permit two-way communications with execution core 120. First-level cache 130 may be used to store data entries to be used by execution core 120 to execute the decoded instructions. First-level cache may also be coupled to a memory ordering buffer ("MOB") 140 to permit two-way communications and coupled to a higher-level cache (not shown) to obtain needed data. MOB 140 may include a store address buffer ("SAB") 142 to store address information on operation entries being executed and a store data buffer ("SDB") 144 to store data related to the store address information for the operation entries being executed.

Figure 2:
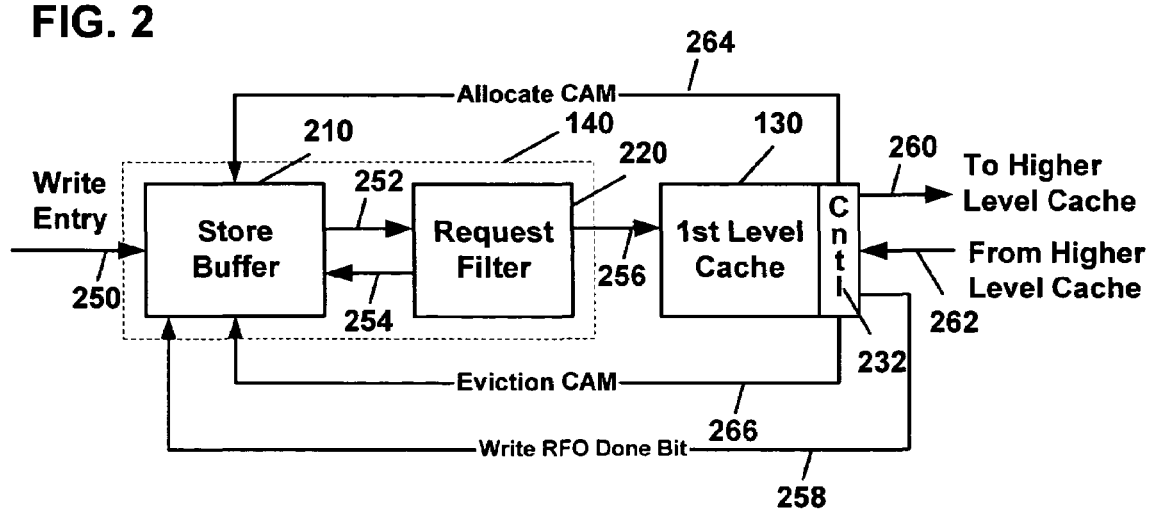
FIG. 2 is a partial, detailed functional block diagram of the out-of-order processor of FIG. 1 that illustrates the processes and processor component interactions, in accordance with an embodiment of the present invention.

FIG. 2 is a partial, detailed functional block diagram of the out-of-order processor of FIG. 1 that illustrates the processes and processor component interactions, in accordance with an embodiment of the present invention. In FIG. 2, MOB 140 may include a store buffer 210 to receive the addresses and data for each entry coupled to a request filter 220 to permit two-way communications. In an alternate embodiment, store buffer 210 may include SAB 142 to store the entry addresses and SDB 144 to store the associated data for each address. Therefore, the following discussion may apply to the present embodiment of store buffer 210 being a single unit to store the entry addresses and data as well as an embodiment where store buffer 210 includes SAB 142 to store the entry addresses and SDB 144 to store the data associated with each address. Store buffer 210 also may include an RFO done bit to be associated with each entry. In the embodiment with SAB 142 and SDB 144, the RFO done bit may be stored with the address in SAB 142. Request filter 220 may act to filter out multiple requests to first-level cache 150 for the same data from store buffer 210 to prevent wasting valuable processor cycles to retrieve the same data multiple times. Request filter 220 also may be coupled to first-level cache 130, which may be coupled to a higher-level cache (not shown). First-level cache 130 may include a first-level cache controller 232, which may act to control the operation of first-level cache 130 and communicate with the higher level cache (not shown) and store buffer 210.

In FIG. 2, in accordance with an embodiment of the present invention, an entry may be written (250) into store buffer 210 from, for example, execution core 120. Upon receiving the entry, store buffer 210 may send (252) a request to first-level cache 130 via request filter 220 to determine whether the entry is in first-level cache 130 and is also in either a modified or an exclusive state. The modified and exclusive protocol states are states in a Modified, Exclusive, Shared, Invalid (MESI) cache coherency protocol developed by Intel Corporation of Santa Clara, Calif. The modified protocol state may indicate that the cache line with which it is associated has been modified but remains exclusively owned, that is, owned by a single operation within the processor. The exclusive protocol state may indicate that the cache line with which it is associated is unmodified and exclusively owned by a single operation within the processor.

In FIG. 2, in accordance with an embodiment of the present invention, request filter 220 may maintain a listing of previous requests to first-level cache 130 and may compare each request from store buffer 210 against that list. If a prior, pending request exists for the new request in the list, the new request may be cancelled and a notification of the cancellation may be sent (254) back to store buffer 210 from request filter 220. If a prior, pending request does not exist for the new request in the list, the new request may be added to the list and forwarded (256) on to first-level cache 130. The RFO done bit may be written (258) back to the entry in store buffer 210, if the entry is in first-level cache 130. If the entry is not in first-level cache 130, first-level cache 130, for example, first-level cache controller 232, may send (260) a request for the entry to a higher level cache and then wait for the entry to be returned (262) and stored in first-level cache 130. Once the entry is returned from the higher level cache, first-level cache 130, for example, first-level cache controller 232, may send (264) an allocate CAM to store buffer 210 to set the RFO done bits for all entries in store buffer 210 that match the entry just stored back into first-level cache 150. Thus, a single request (252) may result in the setting of RFO done bits for all entries that match the entry that caused the request. When the request from memory comes back and fills the cache hierarchy the corresponding entry in the request filter is de-allocated. Either the request itself denotes the entry in the request filter that needs to be de-allocated or the request filter is CAM'ed with the address of the returning request's address to determine which entry to de-allocate.

In FIG. 2, in accordance with an embodiment of the present invention, after first-level cache 130 is forced to allocate over or evict a cacheline, first-level cache 130, for example, first-level cache controller 232, may send (266) an eviction CAM to store buffer 210 to reset the RFO done bit for all entries in store buffer 210 that match the retiring entry. Thus, the eviction of a single entry may result in the re-setting of RFO done bits for all entries that match the retiring entry. In general, the RFO done bit may be reset in the store buffer when a cache line is either allocated over (because some other value is filling the cache line) or when there is an external snoop that hits the cache line, so the cache line needs to be invalidated (exclusive state) or evicted (modified state).

Figure 3:
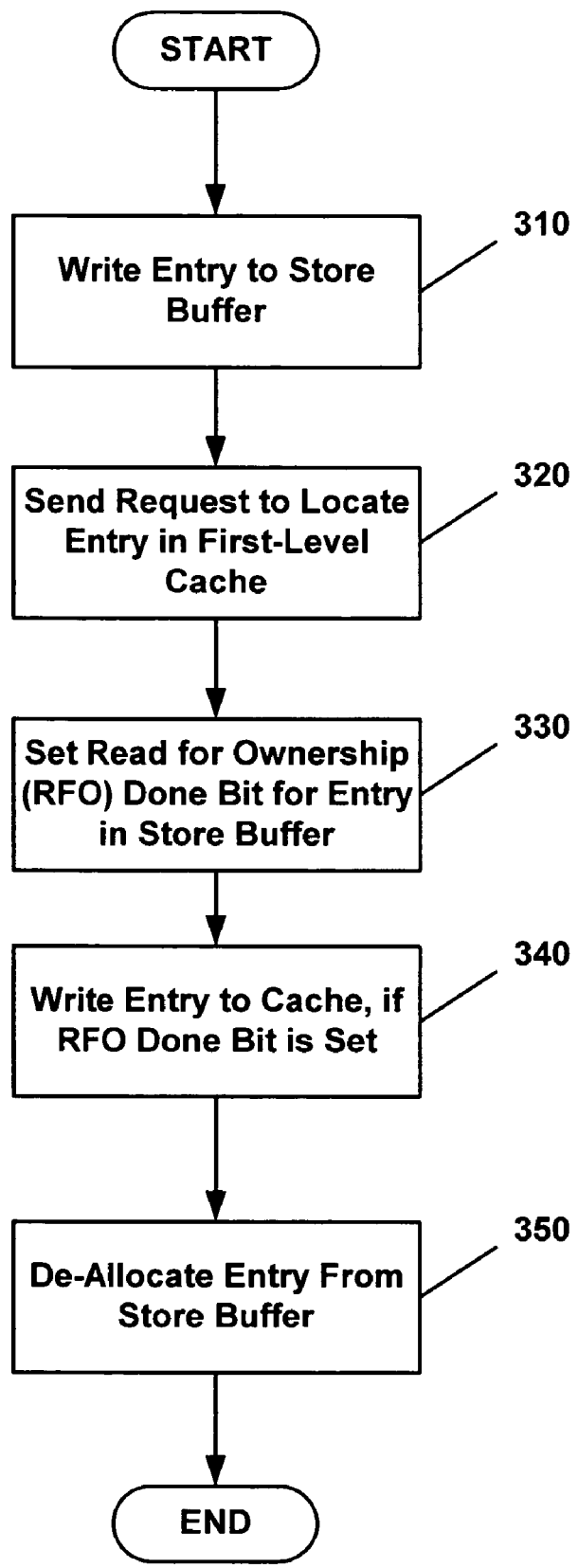
FIG. 3 is a flow diagram of a method, in accordance with an embodiment of the present invention.

FIG. 3 is a flow diagram of a method, in accordance with an embodiment of the present invention. In FIG. 3, an entry may be written (310) to a store buffer, for example, store buffer 210, and a request to locate the entry in a first-level cache, for example, first-level cache 130, that is coupled to the store buffer may be sent (320) from the store buffer. An RFO done bit associated with the entry in the store buffer may be set (330), if the entry is located in the first-level cache and the entry in the first-level cache is exclusively owned by the same process/operation as the entry in the store buffer. When the entry is ready to be committed and the RFO done bit is set, the entry may be written (340) to the first-level cache, which may be a write back cache or a write through cache, and storing/writing the entry out to main memory may occur in accordance with the protocol associated with the first-level cache. The entry may be de-allocated (350) from the store buffer and the method may terminate.

Figure 4:
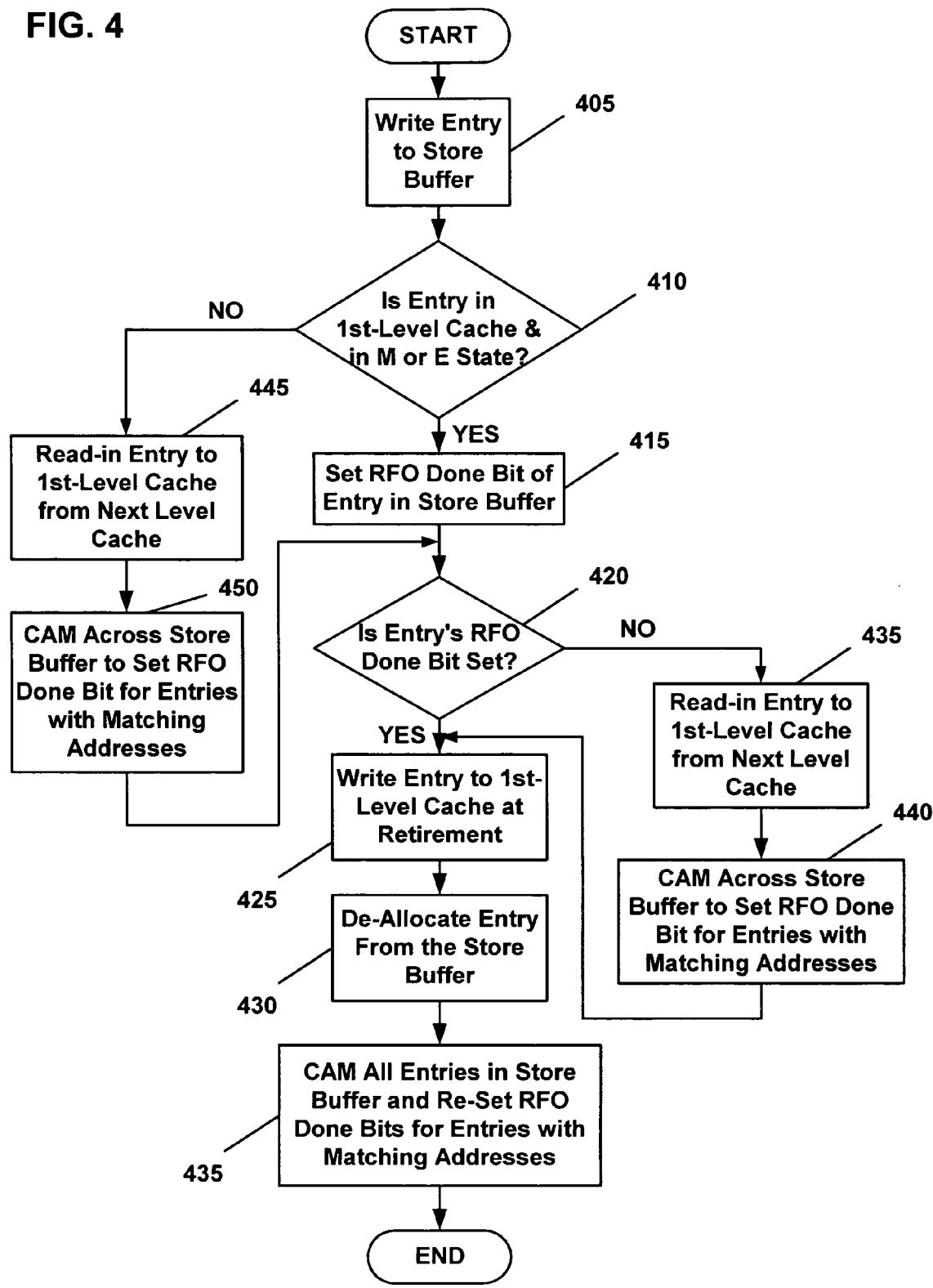
FIG. 4 is a detailed flow diagram of a method, in accordance with an embodiment of the present invention.

FIG. 4 is a detailed flow diagram of a method, in accordance with an embodiment of the present invention. In FIG. 4, an entry's store address and data may be written (405) to a store buffer by a processor. Whether the entry is located in the first-level cache and is in a modified-exclusive or exclusive state may be determined (410). An RFO done bit may be set (415) for the entry in the store buffer, if the entry is in the first-level cache and is in a modified-exclusive or exclusive state. Whether the RFO done bit of the entry in the store buffer is set may be determined (420). The entry may be written (425) immediately to the first-level cache from the store buffer, if the RFO done bit is determined (420) to be set in the store buffer. The entry may be de-allocated (430) from the store buffer.

Alternatively, in FIG. 4, the entry may be read-in (450) to the first-level cache from a higher level memory, if the RFO done bit is determined (420) to be unset in the store buffer. All of the entries in the store buffer may be CAM'ed (440) to set the RFO done bit in each entry that matches the read-in (435) entry. Since, reading-in (435) the entry from a higher level memory will result in the processor having to wait for the entry to load, having to read-in (435) entries to the first-level cache from other memories this close to retirement of the entry should be kept to a minimum.

In FIG. 4, in accordance with an embodiment of the present invention, the entry may be read-in (445) to the first-level cache from a higher level memory, if the entry is determined (410) not to be located in the first-level cache and/or is determined (410) not to be in a modified-exclusive or exclusive state. The entry may be read-in (445) to the first-level cache from a higher level memory, if the entry is determined (410) not to be located in the first-level cache and/or is determined (410) not to be in a modified-exclusive or exclusive state. Although, reading-in (445) the entry from a higher level memory, which results in the processor having to wait for the entry to load, affects the speed of the processor, reading-in (445) the entry now may have less effect on overall performance than reading-in (435) the entry just before retirement. This may, in part, be due to the fact that the entry may still be in use by the processor and the wait time may not have the same effect on the overall speed of the processor as when the read occurs at retirement. All of the entries in the store buffer may be CAM'ed (450) to set the RFO done bit in each entry that matches the read-in (445) entry. Whether the RFO done bit of the entry in the store buffer is set may be determined (420). The entry may be written (425) immediately to the first-level cache from the store buffer, if the RFO done bit is determined (420) to be set in the store buffer. The entry may be de-allocated (430) from the store buffer.

Figure 5:
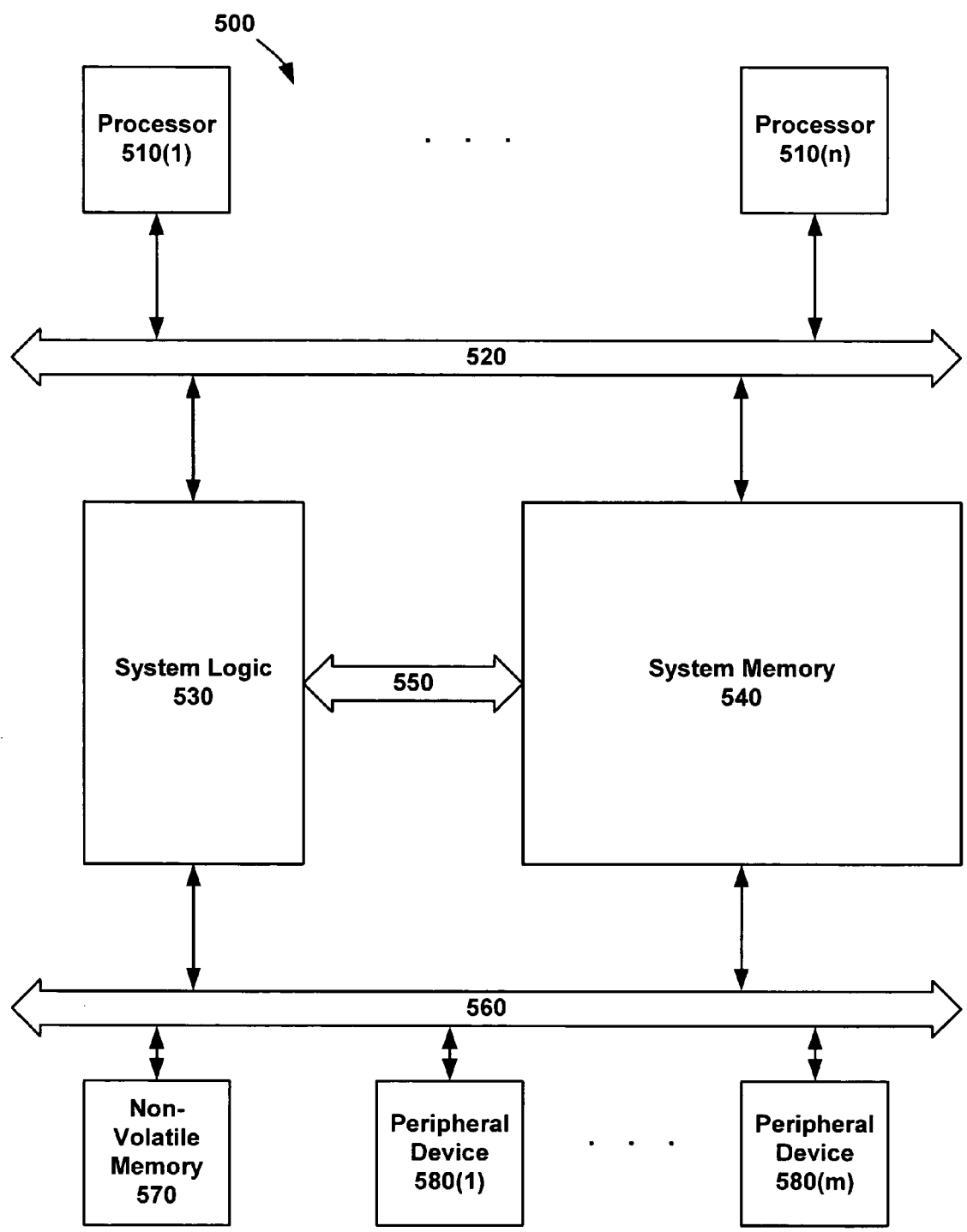
FIG. 5 is a block diagram of a computer system including an architectural state with one or more processors and memory in accordance with an embodiment of the present invention.

FIG. 5 is a block diagram of a computer system, which may include an architectural state, including one or more processors and memory, in accordance with an embodiment of the present invention. In FIG. 5, a computer system 500 may include one or more processors 510(1)–510(n) coupled to a processor bus 520, which may be coupled to a system logic 530. Each of the one or more processors 510(1)–510(n) may be N-bit processors and may include a decoder (not shown) and one or more N-bit registers (not shown). System logic 530 may be coupled to a system memory 540 through a bus 550 and coupled to a non-volatile memory 570 and one or more peripheral devices 580(1)–580(m) through a peripheral bus 560. Peripheral bus 560 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 570 may be a static memory device such as a read only memory (ROM) or a flash memory. Peripheral devices 580(1)–580(m) may include, for example, a keyboard; a mouse or other pointing devices; mass storage devices such as hard disk drives, compact (CD) drives, optical disks, and digital video disc (DVD) drives; displays and the like.

Although the present invention has been disclosed in detail, it should be understood that various changes, substitutions, and alterations may be made herein. Moreover, although software and hardware are described to control certain functions, such functions can be performed using either software, hardware or a combination of software and hardware, as is well known in the art. Likewise, in the claims below, the term "instruction" may encompass an instruction in a Reduced Instruction Set Computer ("RISC") architecture or an instruction in a Complex Instruction Set Computer ("CISC") architecture, as well as instructions used in other computer architectures. Other examples are readily ascertainable by one skilled in the art and may be made without departing from the spirit and scope of the present invention as defined by the following claims.

What is claimed is:

1. A method comprising:
   writing an entry to a store buffer;
   determining said entry is in a first-level cache associated with said store buffer;
   setting a status bit associated with said entry in said store buffer;
   writing the entry to the first-level cache at retirement if the status bit is set; and
   de-allocating the entry from said store buffer at retirement.

2. The method of claim 1 wherein writing an entry to a store buffer comprises:
   writing an address and associated data for the entry to said store buffer.

3. The method of claim 2 wherein writing an address and associated data for the entry to said store buffer comprises:
   writing the address for the entry to a store address buffer in said store buffer; and
   writing the associated data for the entry to a store data buffer in said store buffer.

4. The method of claim 1 wherein setting a status bit associated with said entry in said store buffer comprises:
  writing a status bit to said store buffer from said first-level cache.

5. The method of claim 1 wherein writing the entry to the first-level cache at retirement when the status bit is set comprises:
  determining the entry is being retired;
  determining the status bit associated with the entry is set; and
  writing the entry to the first-level cache.

6. The method of claim 1 wherein de-allocating the entry from said store buffer at retirement comprises:
  re-setting the status bit associated with the entry.

7. The method of claim 6 further comprising:
  re-setting the status bit associated with entries in the store buffer having addresses that correspond to the address of the entry.

8. The method of claim 1 further comprising:
  re-setting the status bit associated with the entry, if the entry in the first-level cache is allocated over or snooped.

9. The method of claim 8 further comprising:
  re-setting the status bit associated with entries in the store buffer having addresses that correspond to the address of the entry in the first-level cache, if the entry in the first-level cache is allocated over or snooped.

10. The method of claim 1 wherein determining said entry is in a first-level cache associated with said store buffer comprises:
  sending a request to said first-level cache to determine whether said entry is in said first-level cache and is in a modified or exclusive state from said store buffer;
  determining that said entry is in said first-level cache and is in a modified or exclusive state; and
  receiving a write to set the status bit associated with the entry in said store buffer from said first-level cache.

11. The method of claim 1 wherein determining said entry is in a first-level cache associated with said store buffer comprises:
  sending a request to said first-level cache to determine whether said entry is in said first-level cache and is in a modified or exclusive state from said store buffer;
  determining that said entry is either not in said first-level cache or is in a modified or exclusive state;
  reading in the entry from a next level cache; and
  setting the status bit associated with each entry in said store buffer that matches said entry.

12. The method of claim 1 wherein writing the entry to the first-level cache at retirement when the status bit is set comprises:
  determining whether the status bit is set; and
  writing the entry to the first-level cache from the store buffer, if the read for ownership bit is set.

13. The method of claim 1 wherein writing the entry to the first-level cache at retirement when the status bit is set comprises:
  determining whether a read for ownership done bit is set;
  reading the entry in to said first level cache from a next-higher level cache, if the status bit is not set; and
  writing the entry to the first-level cache from the store buffer.

14. A machine-readable medium having stored thereon a plurality of executable instructions to perform a method comprising:
  writing an entry to a store buffer;
  determining said entry is in a first-level cache associated with said store buffer;
  setting a status bit associated with said entry in said store buffer;
  writing the entry to the first-level cache at retirement if the status bit is set; and
  de-allocating the entry from said store buffer at retirement.

15. The machine-readable medium of claim 14 wherein writing an entry to a store buffer comprises:
  writing an address and associated data for the entry to said store buffer.

16. The machine-readable medium of claim 15 wherein writing an address and associated data for the entry to said store buffer comprises:
  writing the address for the entry to a store address buffer in said store buffer; and
  writing the associated data for the entry to a store data buffer in said store buffer.

17. The machine-readable medium of claim 14 wherein setting a status bit associated with said entry in said store buffer comprises:
  writing a status bit to said store buffer from said first-level cache.

18. The machine-readable medium of claim 14 wherein writing the entry to the first-level cache at retirement when the status bit is set comprises:
  determining the entry is being retired;
  determining the status bit associated with the entry is set; and
  writing the entry to the first-level cache.

19. The machine-readable medium of claim 14 wherein de-allocating the entry from said store buffer at retirement comprises:
  re-setting the status bit associated with the entry.

20. The machine-readable medium of claim 19 wherein the method further comprises:
  re-setting the status bit associated with entries in the store buffer having addresses that correspond to the address of the entry.

21. The machine-readable medium of claim 14 wherein the method further comprises:
  re-setting the status bit associated with the entry, if the entry in the first-level cache is allocated over or snooped.

22. The machine-readable medium of claim 21 wherein the method further comprises:
  re-setting the status bit associated with entries in the store buffer having addresses that correspond to the address of the entry in the first-level cache, if the entry in the first-level cache is allocated over or snooped.

23. The machine-readable medium of claim 14 wherein determining said entry is in a first-level cache associated with said store buffer comprises:
  sending a request to said first-level cache to determine whether said entry is in said first-level cache and is in a modified or exclusive state from said store buffer;
  determining that said entry is in said first-level cache and is in a modified or exclusive state; and
  receiving a write to set the status bit associated with the entry in said store buffer from said first-level cache.

24. The method of claim 14 wherein determining said entry is in a first-level cache associated with said store buffer comprises:

sending a request to said first-level cache to determine whether said entry is in said first-level cache and is in a modified or exclusive state from said store buffer;

determining that said entry is either not in said first-level cache or is in a modified or exclusive state;

reading in the entry from a next level cache; and setting the status bit associated with each entry in said store buffer from that matches said entry.

25. The method of claim 14 wherein writing the entry to the first-level cache at retirement when the status bit is set comprises:

determining whether the status bit is set; and writing the entry to the first-level cache from the store buffer, if the read for ownership bit is set.

26. The method of claim 14 wherein writing the entry to the first-level cache at retirement when the status bit is set comprises:

determining whether the status bit is set; reading the entry in to said first level cache from a next-higher level cache, if the status bit is not set; and writing the entry to the first-level cache from the store buffer.

27. A processor comprising:

a store buffer to store cache entry address and data information from a processor;

a request filter coupled to said store buffer; and a first-level cache coupled to said request filter to store entry information;

said request filter to filter out duplicate requests for the entry from said store buffer.

28. The processor of claim 27 further comprising:

an execution unit coupled to said first-level cache and said store buffer.

29. The processor of claim 28 wherein said execution unit comprises:

a pipelined, out-of-order processor.

30. The processor of claim 28 wherein said store buffer comprises:

a store address buffer (SAB); and a store data buffer (SDB).

31. The processor of claim 27 wherein said first-level cache comprises:

a write-back cache.

32. A processor comprising:

a front-end unit to fetch instructions, decode the instructions and store the decoded instructions;

an execution core coupled to said front-end unit to execute the decoded instructions;

a first-level cache coupled to said execution core to store data to be used to execute the decoded instructions;

a store buffer coupled to said execution core and said first-level cache to store new values resulting from the execution of the decoded instructions for the entries from said first-level cache; and a retirement unit coupled to said execution component to receive results from the execution of said decoded instructions and to commit the results to the architectural state;

said processor including a machine-readable medium having stored thereon a plurality of executable instructions to perform a method comprising:

writing an entry to a store buffer;

determining said entry is in a first-level cache associated with said store buffer;

setting a status bit associated with said entry in said store buffer;

writing the entry to the first-level cache at retirement when the status bit is set; and de-allocating the entry from said store buffer at retirement.

33. The processor of claim 32 wherein said store buffer comprises:

a store address buffer (SAB); and a store data buffer (SDB).

34. The processor of claim 32 wherein said status bit comprises:

a read for ownership done bit.

35. A computer system comprising:

a memory; and a processor coupled to the memory, the processor comprising:

a store buffer to store cache entry address and data information from a processor;

a request filter coupled to said store buffer; and a first-level cache coupled to said request filter to store entry information;

said request filter to filter out duplicate requests for the entry from said store buffer.

36. The computer system of claim 35 wherein the processor further comprises: an execution unit coupled to said first-level cache and said store buffer.

37. The computer system of claim 35 wherein the processor further comprises: a pipelined, out-of-order processor.

* * * * *

UNITED STATES PATENT AND TRADEMARK OFFICE
CERTIFICATE OF CORRECTION

| | |
|---|---|
| PATENT NO. | : 7,130,965 B2 |
| APPLICATION NO. | : 10/743134 |
| DATED | : October 31, 2006 |
| INVENTOR(S) | : Per H. Hammarlund et al. |

It is certified that error appears in the above-identified patent and that said Letters Patent is hereby corrected as shown below:

In column 9, line 8, please change the line as follows:

"from that matches said entry," should read --from that which matches said entry.--

Signed and Sealed this

Twenty-eighth Day of August, 2007

JON W. DUDAS
*Director of the United States Patent and Trademark Office*